July 9, 1957  H. O. DARBY  2,798,738
TRACTION WEIGHTS
Filed Aug. 9, 1956

INVENTOR
Hermond O. Darby
BY
Ashley & Ashley
ATTORNEYS

United States Patent Office 2,798,738
Patented July 9, 1957

2,798,738

TRACTION WEIGHTS

Hermond O. Darby, Pampa, Tex.

Application August 9, 1956, Serial No. 602,987

1 Claim. (Cl. 280—150)

This invention relates to new and useful improvements in traction weights.

One object of the invention is to provide an improved traction weight for increasing the tractive effort of the traction wheels of a vehicle.

Another object of the invention is to provide an improved traction weight of such construction that it may be rapidly mounted on and demounted from the housing of a drive axle without altering the construction of the axle housing.

A further object of the invention is to provide an improved traction weight which is generally circular in shape and which is slotted so as to be capable of being mounted around the axle housing of a tractor adjacent its wheels and fenders without interfering with the normal operation of the tractor, the weight having means for connection with the fender mounts.

A construction designed to carry out the invention will be hereinafter described, together with other features of the invention.

Figure 1:
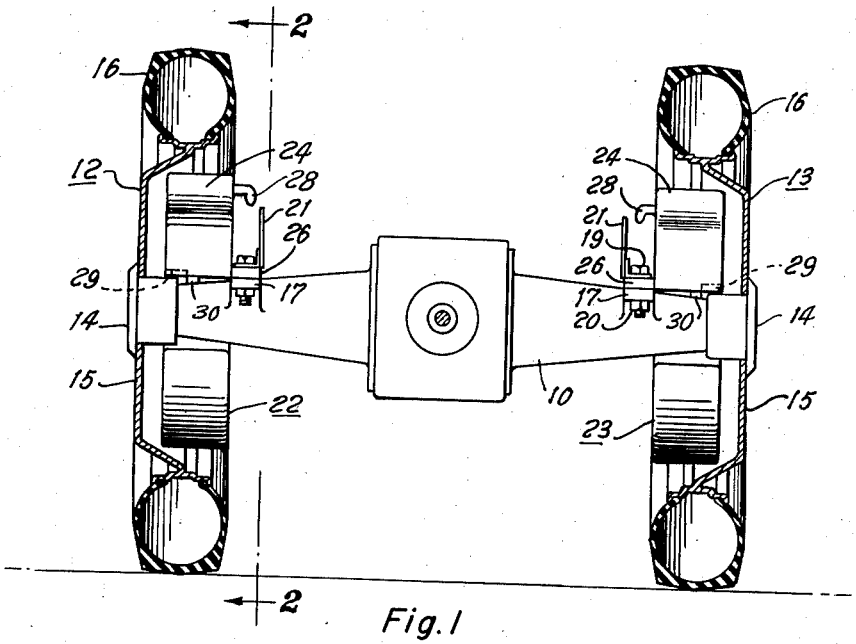
Figure 2:
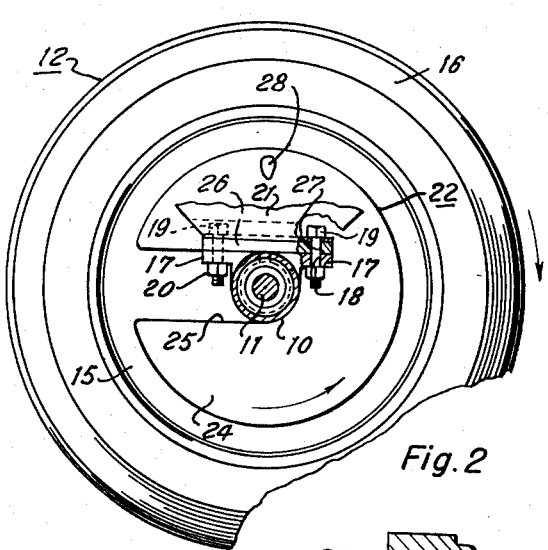
Figure 3:
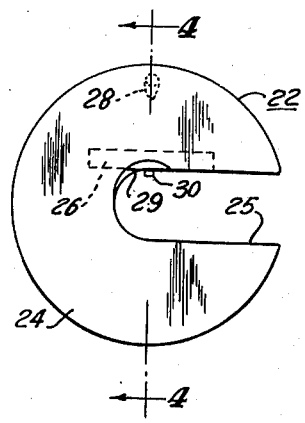
Figure 4:
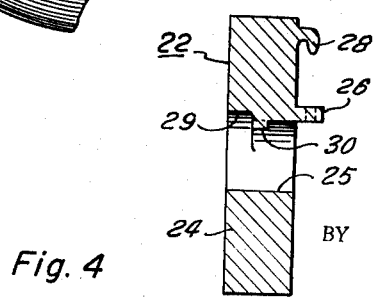

The invention will be more readily understood from a reading of the following specification and by reference to the accompanying drawing, wherein an example of the invention is shown, and wherein:

Fig. 1 is a transverse, vertical, sectional view of a conventional tractor showing traction weights mounted on its drive axle housing in accordance with the invention, Fig. 2 is a transverse, vertical, sectional view, taken on the line 2—2 of Fig. 1, Fig. 3 is a side elevational view of the right-hand traction weight, and Fig. 4 is a transverse, vertical, sectional view, taken on the line 4—4 of Fig. 3.

In the drawing, the numeral 10 designates the rear axle housing of a conventional tractor which has the usual drive axles 11 mounted therein (Fig. 2). Right- and left-hand traction wheels 12 and 13 are mounted on the outer ends of the axle 11 and include hubs 14, dished disks 15 and tires 16. Adjacent each end and spaced inwardly of the hubs 14, the axle housing carries a pair of horizontal ears or lugs 17 which extend laterally outward or forwardly and rearwardly from the upper portion of said housing. The ears 17 have openings 18 for receiving bolts 19 and nuts 20 to support fenders 21 in the usual manner.

Right- and left-hand traction weights 22 and 23 are mounted on the axle housing 10 adjacent the hubs 14 and each weight includes a relatively thick, substantially circular body 24 having an axle housing receiving slot 25. Each slot extends radially of its body 24 from the axis thereof through the periphery and is of a width to accommodate the ends of the axle housing. A horizontal flange 26 projects laterally from the inner face of each body 24 immediately above and in parallel relation to its slot 25 and is adapted to engage and rest on the axle housing and its ears 17 for supporting said body in place. Preferably, the lower surface of the flange is flush with the upper surface of the slot (Fig. 4). The flanges 26 have openings 27 which are adapted to register with the openings 18 of the ears for receiving the bolts 19.

For mounting and demounting the traction weight relative to the axle housing, a hook 28 extends outwardly from each body 22 above and in spaced relation to its flange. As shown by the numeral 29, the inner end of the slot 25 is recessed or relieved at its upper portion to provide clearance between the body and the adjacent wheel hub 14 as well as to facilitate the mounting of said body on the axle housing (Figs. 3 and 4). It is noted that the recess 29 is in the outer surface of the body, while the flange 26 and hook 28 are formed on the inner surface of said body. A lug or projection 30 depends from the upper portion of the slot adjacent the recess 29 for engaging the tapered or reduced outer end of the axle housing so as to support the weight in parallel relation to the wheel disk 14. Although of identical construction, the weights 22 and 23 are reversed relative to each other to permit mounting of the same from the rear of the tractor and in the same relationship. As a result, the slots 25 extend through the front portion of the weight bodies 24.

When it is desired to increase the tractive effort of the traction wheels 12 and 13, traction weights 22 and 23 having the desired weight are selected and mounted on the axle housing 10 between said wheels. The fenders 21 are removed by unfastening the bolts 29 and nuts 20 and a suitable hoist (not shown) is connected to the hook 28 of one of the weights to permit positioning of said weight relative to the axle housing. The tractor may be moved or the hoist may be moved to engage the axle housing in the slots 25 of the weight. Upon registration of the openings 27 of the flange 26 with the openings 18 of the ears 17, the bolts 19 are passed through said openings and secured by their nuts 20 in the usual manner. Of course, the fender 21 is replaced simultaneously with the replacement of the bolts. Both of the weight bodies 24 are mounted in this manner and said bodies are secured to the axle housing adjacent and within the dished disks 15 of the wheels 12 and 13. The weights may be removed, whenever desired, and weights having different weight characteristics may be substituted therefor.

In addition to providing the weight necessary for efficient operation of the tractor, the construction of the weights 22 and 23 is such that available unused space is utilized without interfering with the normal use and operation of the tractor. Since the slots 25 are formed in the front portions of the weight bodies 24, the greatest mass of the weight is disposed rearwardly of the axle housing so as to increase the effectiveness of said weight.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

In a farm tractor, an axle housing, outwardly dished traction wheels carried by the axle housing for rotation adjacent opposite ends thereof, ears extending laterally outward from said axle housing adjacent the wheels, substantially circular traction weights having radial axle receiving slots extending therethrough and opening through the peripheries thereof, flanges extending outwardly from the weights adjacent the top walls of the slots and engaging the ears, and fasteners extending through said ears and flanges for detachably holding the traction weights on said axle housing within the cavities defined by the dished portions of said wheels and with the open ends of the slots disposed toward the advancing side of said axle housing.

References Cited in the file of this patent

UNITED STATES PATENTS

| | | |
|---|---|---|
| 1,687,296 | Johnson | Oct. 9, 1928 |
| 2,621,060 | Onarheim | Dec. 9, 1952 |